United States Patent
Aubert

(10) Patent No.: US 11,407,152 B2
(45) Date of Patent: Aug. 9, 2022

(54) DEVICE FOR OVERMOLDING A CORE

(71) Applicant: ETANCHEITE ET FROTTEMENT J. MASSOT, Saint Lubin des Joncherets (FR)

(72) Inventor: Guy Aubert, Saint Prest (FR)

(73) Assignee: ETANCHEITE ET FROTTEMENT J.MASSOT, Saint Lubin des Joncherets (FR)

( * ) Notice: Subject to any disclaimer, the term of this patent is extended or adjusted under 35 U.S.C. 154(b) by 144 days.

(21) Appl. No.: 16/811,933

(22) Filed: Mar. 6, 2020

(65) Prior Publication Data
US 2020/0282612 A1 Sep. 10, 2020

(30) Foreign Application Priority Data
Mar. 8, 2019 (FR) ...................................... 1902379

(51) Int. Cl.
*B29C 45/14* (2006.01)
*B29C 45/56* (2006.01)

(52) U.S. Cl.
CPC .. *B29C 45/14065* (2013.01); *B29C 45/14549* (2013.01); *B29C 45/56* (2013.01)

(58) Field of Classification Search
CPC ............ B29C 2045/5695; B29C 45/14; B29C 45/14065
See application file for complete search history.

(56) References Cited

U.S. PATENT DOCUMENTS

| | | | | |
|---|---|---|---|---|
| 3,516,123 A | * | 6/1970 | Lang ........................ | B29C 45/12 425/166 |
| 4,473,516 A | * | 9/1984 | Hunerberg ........... | B29C 44/0407 264/45.1 |
| 4,734,243 A | * | 3/1988 | Kohama ................. | B29C 45/12 264/328.14 |
| 5,531,949 A | * | 7/1996 | Heitfiled .............. | A63C 17/223 249/134 |

(Continued)

FOREIGN PATENT DOCUMENTS

| | | | | |
|---|---|---|---|---|
| DE | 2910227 | | 9/1980 | |
| EP | 1577073 | | 9/2005 | |
| GB | 1309099 A | * | 3/1973 | ....... B29C 45/14491 |

(Continued)

OTHER PUBLICATIONS

French Search Report from corresponding French Patent Application No. 1902379, dated Nov. 15, 2019.

*Primary Examiner* — Robert B Davis
(74) *Attorney, Agent, or Firm* — Greer, Burns & Crain, Ltd

(57) ABSTRACT

A method for manufacturing an object having a polymer part, including inserting a core through a movable element via a hole passing through the movable element, inserting the polymer part in a mould, inside which the movable element is arranged, so that the polymer part is in contact with the movable element on a first side of the movable element, displacing the movable element in the mould by exerting a force, originating from the polymer part, on the movable element in such a way that the movable element slides along the core, the movable element constraining, at an entrance of the hole on the first side, at each instant and as the movable element is displaced, the position of the portion of the core in the course of being covered with polymer at this instant.

17 Claims, 5 Drawing Sheets

(56) References Cited

U.S. PATENT DOCUMENTS 5,798,073 A * 8/1998 Johnson .............. B29C 45/2628
                                                                             264/313
2002/0024169 A1 * 2/2002 Nishizawa .............. B29C 45/56
                                                                             264/429

FOREIGN PATENT DOCUMENTS

| JP | 56024140 | 3/1981 |
| JP | 11019972 | 1/1999 |
| JP | 2000252733 | 9/2000 |
| WO | 2017037229 | 3/2017 |

\* cited by examiner

[Figure 1]
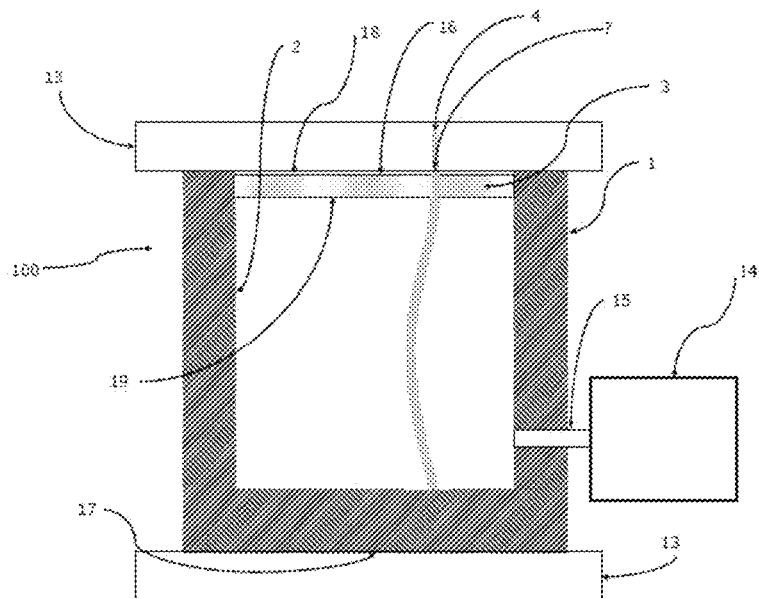
[Figure 2]
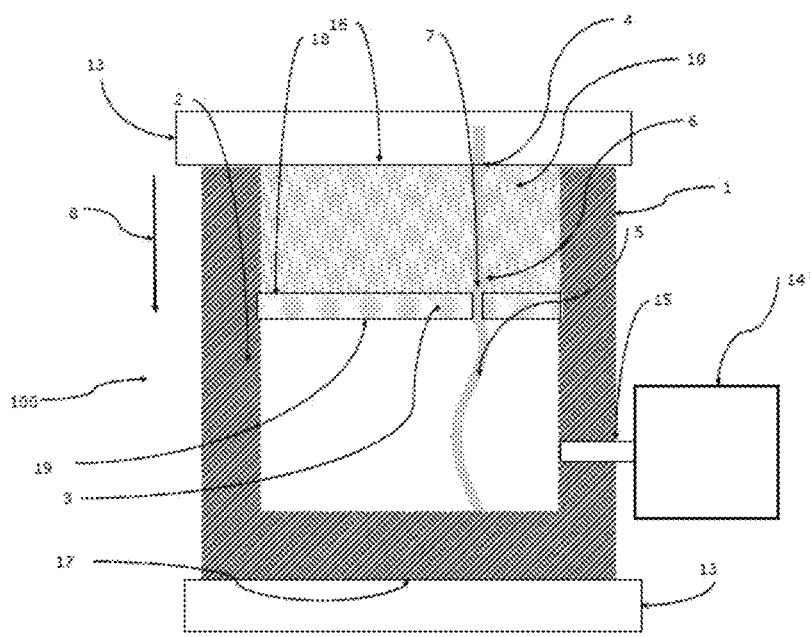

[Figure 3]
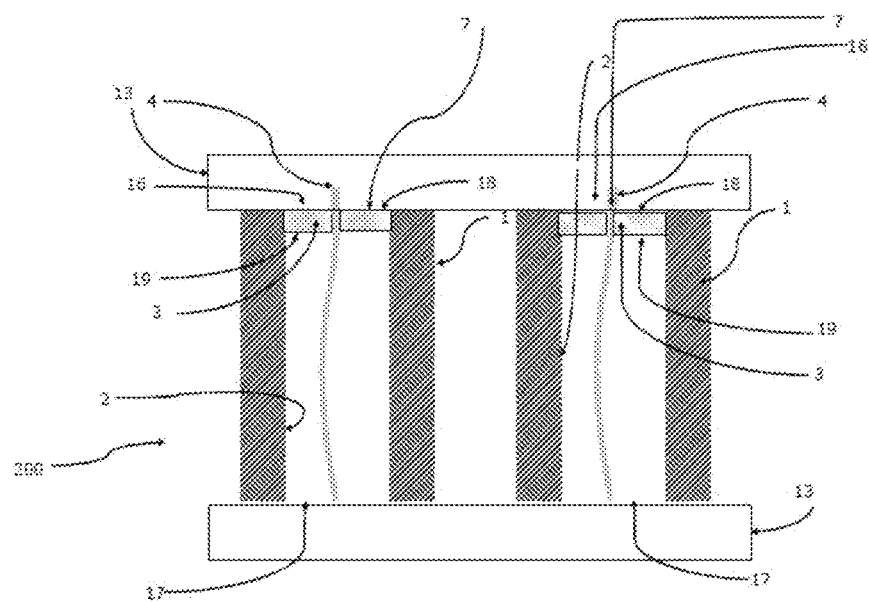
[Figure 4]
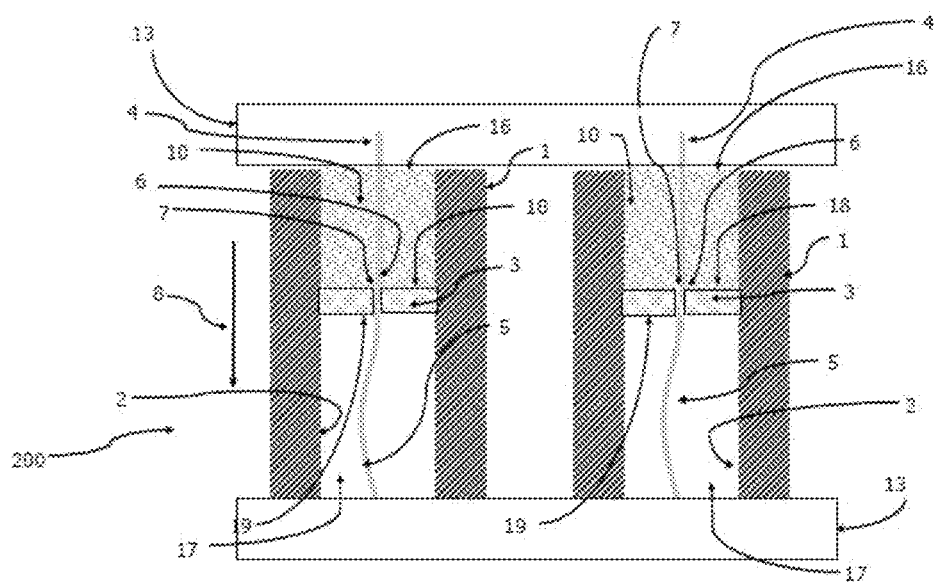

[Figure 5]
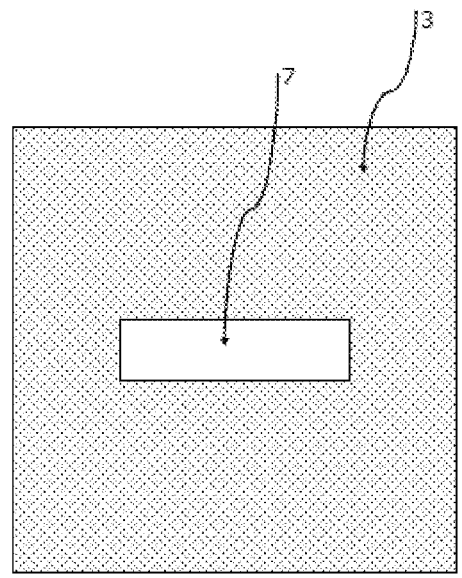
[Figure 6]
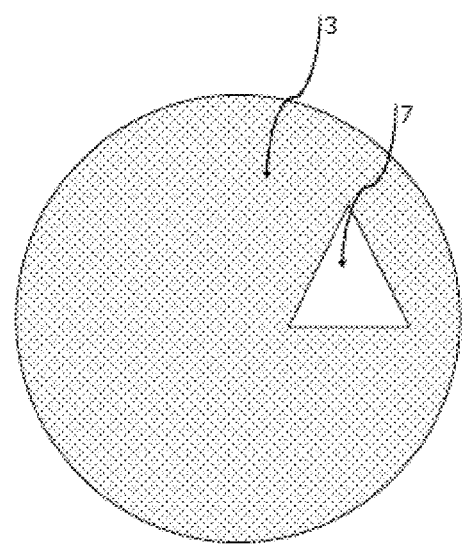

[Figure 7]
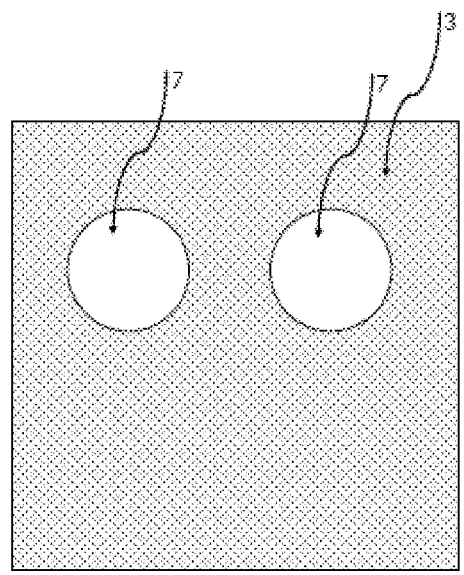
[Figure 8]
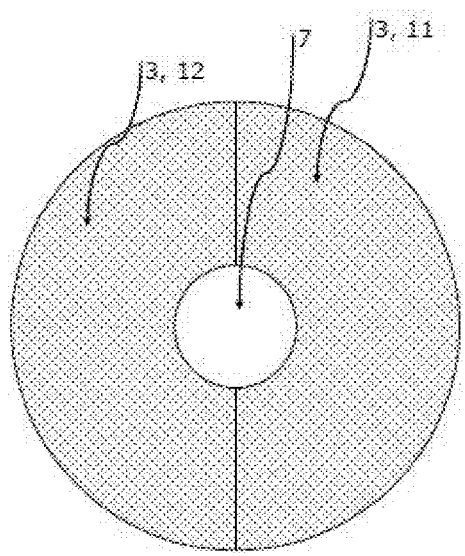

[Figure 9]
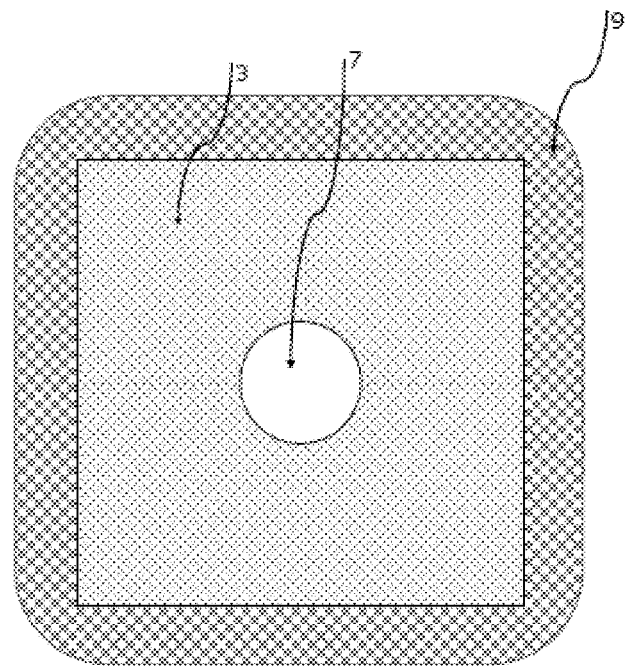
[Figure 10]
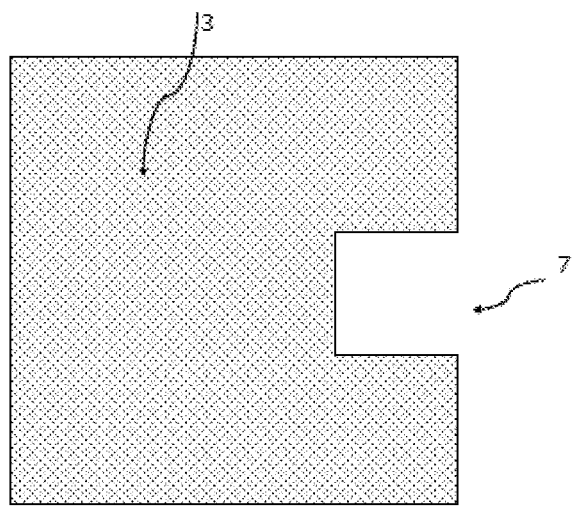

DEVICE FOR OVERMOLDING A CORE

BACKGROUND

The present invention relates to a method for manufacturing an object comprising a polymer part. It also relates to a device for manufacturing an object comprising a polymer part.

The invention allows a user to position a core at a desired, determined position in a polymer part.

The field of the invention is more particularly that of the manufacture of an object comprising a polymer part and a core the position of which is to be controlled, for example in the manufacture of an antenna.

Devices for overmoulding a core are known, which require the core to be borne by elements of the mould so that the core is positioned with respect to the final object. Thus, for various products, in particular products of great length such as antennas, the core is borne by feet or by needles while it is being covered with elastomer. These feet allow the core to be centred in the part made of elastomer, but leave recesses when they are extracted from the object. This method of manufacture is functional but poses:

- a problem of aesthetic appearance and/or hermeticity and/or cracking for certain items because of the recesses, this problem being even more troublesome for objects of small section,
- a problem of centring the core, even more troublesome for items of small section.

The aim of the present invention is to solve at least one of the aforementioned problems.

SUMMARY

According to a first aspect of the invention, a method is proposed for manufacturing an object comprising a polymer part, comprising:

- inserting a core through a movable element via a hole passing through the movable element,
- inserting the polymer part in a mould, inside which the movable element is arranged, so that the polymer part is in contact with the movable element on a first side of the movable element,
- displacing the movable element in the mould by exerting a force, originating from the polymer part, on the movable element, in such a way that the movable element slides along the core, the movable element constraining, at an entrance of the hole on the first side, at each instant and as the movable element is displaced, the position of the portion of the core in the course of being covered with polymer at this instant.

The hole of the movable element and the core are preferably of the same section.

The hole of the movable element may be located at the centre of the movable element.

The step of displacing the movable element may be a rectilinear motion in a direction of displacement. The hole preferably passes through the movable element parallel to the direction of displacement of the movable element.

The movable element preferably comprises a central part made of rigid material. Depending on the variant considered:

- the interior of the mould may be of constant section. The movable element and the interior of the mould are preferably of the same section, or
- the movable element may comprise a flexible perimeter so that the movable element has a section that adapts to a variable section of the interior of the mould.

The movable element may centre the core at the centre of the interior of the mould.

The core may be metallic.

The core may comprise a flexible portion.

The polymer part may comprise or may be an elastomer, preferably rubber.

According to the first aspect of the invention, the method may comprise:

- inserting several cores through the movable element, each core being inserted via a respective hole passing through the movable element,
- inserting the polymer part in the mould, inside which the movable element is arranged, so that the polymer part is in contact with the movable element on the first side of the movable element,
- displacing the movable element in the mould by exerting the force, originating from the polymer part, on the movable element, in such a way that the movable element slides along the cores, the movable element constraining, at each instant and as the movable element is displaced, the position of the portion of each core in the course of being covered with polymer at this instant at an entrance of its respective hole on the first side.

The core is preferably held in place relative to the mould by holding means. The holding means may be located outside the mould.

According to the first aspect of the invention, the method may comprise inserting the polymer part in several moulds via a common source of the polymer part, each mould having a movable element arranged within it, in such a way that the polymer part is in contact with this movable element on a first side of this movable element, through which a core is inserted via a hole passing through this movable element, said method according to the invention comprising, for each mould, displacing the movable element in its mould by exerting a force, originating from the polymer part, on the movable element, in such a way that this movable element slides along its core, the movable element constraining, at an entrance of the hole on the first side, at each instant and as this movable element is displaced, the position of the portion of its core in the course of being covered with polymer at this instant, each mould being perforated so as to allow its movable element to leave this mould via an end of the mould opposite an end via which the polymer part is injected.

According to a second aspect of the invention, a device is proposed for manufacturing an object comprising a polymer part, the device comprising:

- a movable element configured for receiving a core via a hole passing through the movable element,
- a mould, inside which the movable element is arranged, said mould comprising an end configured for inserting the polymer part, so that the polymer part is in contact with the movable element on a first side of the movable element,
- the movable element being configured for being displaced in the mould under the action of a force originating from the polymer part, in such a way that the movable element slides along the core, the movable element constraining, at an entrance of the hole on the first side, at each instant and as the movable element is displaced, the position of the portion of the core in the course of being covered with polymer at this instant.

The device according to the invention may comprise the core inserted in the hole in the movable element and in that the hole in the movable element and the core are preferably of the same section.

The hole in the movable element may be located at the centre of the movable element.

The movable element is preferably configured for performing a rectilinear motion in the mould in a direction of displacement. The hole preferably passes through the movable element parallel to the direction of displacement of the movable element.

The movable element may comprise a central part made of rigid material.

The interior of the mould may be of constant section. The movable element and the interior of the mould are preferably of the same section.

The movable element may comprise a flexible perimeter, so that the movable element preferably has a section configured for being adapted to a variable section of the interior of the mould.

The movable element may be configured for centring the core at the centre of the interior of the mould.

The device according to the invention preferably comprises the core and in that the core may be metallic.

The device according to the invention may comprise the core and in that the core preferably comprises a flexible portion.

The device according to the invention may comprise a reservoir of the polymer part ready to be inserted in the mould and in that the polymer part comprises or is an elastomer, preferably rubber.

The device according to the invention may comprise:
the movable element configured for receiving several cores in such a way that each core can be inserted via a respective hole passing through the movable element,
the mould, inside which the movable element is arranged, said mould comprising the end configured for inserting the polymer part, so that the polymer part is in contact with the movable element on the first side of the movable element,
the movable element being configured for being displaced in the mould under the action of the force originating from the polymer part, in such a way that the movable element slides along the cores, the movable element constraining, at each instant and as the movable element is displaced, the position of the portion of each core in the course of being covered with polymer at this instant at an entrance of its respective hole on the first side.

The device according to the invention may comprise holding means configured for holding the core in place relative to the mould. The holding means are preferably located outside the mould.

The device according to the invention may comprise:
several moulds, each mould:
having a movable element arranged within it, this movable element being configured for receiving a core via a hole passing through this movable element and
comprising an end configured for inserting a polymer part, so that the polymer part is in contact with the movable element on a first side of the movable element,
a common source of the polymer part for the several moulds
each movable element being configured for being displaced in its mould under the action of a force originating from the polymer part, in such a way that the movable element slides along its core, this movable element constraining, at an entrance of its hole on the first side, at each instant and as this movable element is displaced, the position of the portion of its core in the course of being covered with polymer at this instant each mould being pierced so as to allow its movable element to leave this mould via an end of the mould opposite an end via which the polymer part is injected.

BRIEF DESCRIPTION OF THE DRAWINGS

Other advantages and features of the invention will become apparent on reading the detailed description of implementations and embodiments which are in no way limitative, and from the following attached drawings:

FIG. 1 is a schematic profile sectional view of a first embodiment of device 100 according to the invention in a step of a first embodiment of the method according to the invention.

FIG. 2 is a schematic profile sectional view of the first embodiment of device 100 according to the invention in a step of the first embodiment of the method according to the invention.

FIG. 3 is a schematic profile sectional view of a second embodiment of device 200 according to the invention in a step of a second embodiment of the method according to the invention.

FIG. 4 is a schematic profile sectional view of the second embodiment of device 200 according to the invention in a step of the second embodiment of the method according to the invention.

FIG. 5 illustrates a variant of the movable element 3 of any one of the embodiments of device 100 and 200 according to the invention, viewed in planes orthogonal to the direction of displacement 8 in FIGS. 2 and 4.

FIG. 6 illustrates a variant of the movable element 3 of any one of the embodiments of device 100 and 200 according to the invention, viewed in planes orthogonal to the direction of displacement 8 in FIGS. 2 and 4.

FIG. 7 illustrates a variant of the movable element 3 of any one of the embodiments of device 100 and 200 according to the invention, viewed in planes orthogonal to the direction of displacement 8 in FIGS. 2 and 4.

FIG. 8 illustrates a variant of the movable element 3 of any one of the embodiments of device 100 and 200 according to the invention, viewed in planes orthogonal to the direction of displacement 8 in FIGS. 2 and 4.

FIG. 9 illustrates a variant of the movable element 3 of any one of the embodiments of device 100 and 200 according to the invention, viewed in planes orthogonal to the direction of displacement 8 in FIGS. 2 and 4.

FIG. 10 illustrates a variant of the movable element 3 of any one of the embodiments of device 100 and 200 according to the invention, viewed in planes orthogonal to the direction of displacement 8 in FIGS. 2 and 4.

DETAILED DESCRIPTION

FIGS. 1, 2, 3, 4 are principle views, in which the respective dimensions of the different elements illustrated are not respected. The same applies to the dimensions in FIGS. 5 to 10.

As these embodiments are in no way limitative, variants of the invention can be considered comprising only a selection of the characteristics described or illustrated hereinafter, in isolation from the other characteristics described (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Firstly, with reference to FIGS. 1, 2 and 6, a first embodiment of the device 100 according to the invention for manufacturing objects comprising a polymer part 10 will be described.

The device according to the invention presented is a device 100 for moulding or for overmoulding a core 4 by self-positioning of the core 4.

The device 100 is in particular a device for manufacturing an object comprising a polymer part 10. The device 100 comprises:
- a movable element 3 configured for receiving a core 4 via a hole 7 passing through the movable element 3,
- a mould 1, inside which the movable element 3 is arranged, said mould 1 comprising an end 16 configured for inserting the polymer part 10, so that the polymer part 10 is in contact with the movable element 3 on a first side 18 of the movable element 3 but not on a second side 19 of the movable element 3.

The sides 18 and 19 form two opposite faces of the movable element 3 connected via the hole 7.

The movable element 3 is configured for being displaced in the mould 1 under the action of a force originating from the polymer part 10, in such a way that the movable element 3 slides along the core 4 without a polymer part 10 passing to the second side 19 of the movable element. The movable element 3 is configured to constrain, at an entrance of the hole 7 on the first side 18, at each instant and as the movable element 3 is displaced, the position 6 of the portion of the core 4 in the course of being covered with polymer 10 at this instant.

In the device 100, the movable element 3 is configured for performing a rectilinear motion in the mould 1 in a direction of displacement 8.

The direction of displacement 8 of the movable element 3 is in particular oriented in the direction of Earth's gravity.

The polymer part 10 may comprise or consist of a thermoplastic, an elastomeric thermoplastic, a thermoset and/or an elastomer.

In the case of FIGS. 1 and 2, the polymer part 10 comprises or is an elastomer, typically rubber. In other words, it may be an elastomer which may or may not be combined with other components (for example colorant and/or some other). If the polymer part 10 is an elastomer, it comprises by weight at least 50% of elastomer, preferably at least 70%, in the present case at least 90%, ideally 100% of elastomer. In the case when the polymer part 10 comprises an elastomer combined with other ingredients; it is a mixture.

The polymer part 10 is a rubber.

In this first embodiment described here, the elastomer is a synthetic rubber, for example a fluorocarbon rubber or FKM, i.e. a terpolymer of hexafluoropropylene, with vinylidene fluoride, tetrafluoroethylene and perfluoromethylvinyl ether (for example, of reference 1710/ND2 from SAFIC ALCAN).

The polymer 1 typically has a hardness of 70 Shore A.

In other embodiments, the rubber may be natural, or synthetic or silicone.

The polymer part 10 may also comprise various additives, for example a colorant, etc.

The device 100 comprises means for injection moulding 13 of polymer.

The injection moulding means 13 are illustrated schematically in some of the figures of the application. The operation of these means 13 is described briefly.

The injection moulding means 13 make it possible to inject the polymer part 10 in the mould 1.

For this, the injection moulding means 13 comprise a source of polymer in which the polymer part 10 is heated and typically maintained at a temperature of 70° C., and from where the polymer 10 injected in the mould 1 originates.

A means for exerting pressure (typically comprising an endless screw) contained in the source of the injection moulding means 13, directs and assists in injecting the polymer part 10 in injecting means.

The polymer part 10 is then conveyed in the mould 1 by means of injecting means, typically injection orifices 2 mm in diameter, comprised in the injection moulding means 13.

The injection moulding means 13 also comprise a press composed of two heating plates, including an upper heating plate traversed by the endless screw, and a lower heating plate, which is also movable.

The mould 1 is therefore positioned and held in position between the two heating plates of the injection moulding means 13 typically by two plates comprised between the heating plates and between which the mould 1 is inserted, including a breaker plate comprised between the upper plate and the mould 1, and a bottom plate between the lower plate and the mould 1.

The temperature of the polymer part 10 is regulated by the two heating plates, typically to reach a temperature of at least 150° C. or even 170° C. on injection of the polymer part 10 in the mould 1.

The device 100 comprises holding means configured for holding the core 4 in place relative to the mould 1.

In the present case, the holding means are located outside the mould 1. In fact, it can be seen that the core 4 is held at the entrance of the mould 1. It is fixed at the level of the source of the polymer part 10, typically at the breaker plate. The device 100 makes it possible to place the core 4 in terms of the end product without using feet. The holding means of the device 100 are configured so as not to leave any recesses in the polymer part 10 contained in the mould 1.

In the device 100, the mould 1 is of cylindrical shape, of constant internal section 2 and constant external section.

By the term "section" is meant the area and the shape of a plane transverse section of an object. In the present description, all the sections are determined perpendicularly to the direction of displacement 8 of the movable element 3 in the mould 1, and/or parallel to the direction of passage of the hole 7 through the movable element 3.

The mould 1 is rigid and for example made of steel.

The dimensions of the mould 1 are typically 700 mm in length, with a wall thickness of 10 mm, with internal diameter or dimensions equal to the diameter or dimensions of the movable element 3.

In this embodiment, the mould 1 is in one piece.

However, the mould 1 is pierced by a hole in which a connecting means 15 has been inserted, in order to connect the mould 1 to a means 14 for aspirating the contents of the mould 1 from the second side 19 of the movable element 3. Said contents may typically be air. This in particular allows the air contained in the mould 1 to be ejected when the movable element 3 is displaced in the mould 1.

The movable element 3, illustrated in FIG. 6, is contained in the interior 2 of the mould 1.

The movable element 3 and the interior 2 of the mould 1 are of the same section.

This feature prevents polymer 10 passing on the second side 19 of the movable element 3, during insertion of the polymer part 10 on the side 18 of the movable element 3.

In the case considered, the movable element 3 is a single-piece circle, for example with a diameter of 40 mm.

The movable element 3 comprises (and comprises only), in this preferred embodiment, a central part made of rigid material in which the hole 7 is pierced.

By the term "rigid material" is meant materials having a hardness above 90 Shore A.

The movable element 3 is made of metal, preferably of steel.

The movable element 3 is typically 3 mm to 20 mm thick in the direction of displacement 8.

The movable element 3 may be of domed shape in the direction of displacement 8.

On the device 100, the core 4 is inserted in the hole 7 of the movable element 3. This hole 7 passes all the way through the movable element 3 in the direction of displacement 8, more precisely, parallel to the direction of displacement 8 of the movable element 3 in the mould 1.

The core 4 may be made of any material.

According to variants, the core 4 may be designed as one and the same material or may be a mixture.

The core 4 may also be configured so as to have parts with different rigidity.

The core 4 may be designed using separate materials or common with the polymer part 10.

In the case of the device 100, the core 4 and the polymer part 10 are of separate materials.

In the case considered, the core 4 is flexible and metallic.

By the term "flexible" is meant preferably materials having a hardness ranging from 5 Shore A to 90 Shore A and/or thin enough to be deformed under their own weight.

The core 4 is of any section, being selected so that the section of the core 4 may be small or large so that the core 4 has a certain flexibility. Typically, for a core 4 of large section, flexibility of the core 4 may be achieved for a core 4 of great length.

In the device 100, the hole 7 is configured so as to be completely surrounded by the material of the movable element 3 in each of its cross-sections of the movable element 3.

The hole 7 of the movable element 3 is not placed at the centre of the movable element 3.

By the term "centre" is meant the barycentre of the section of the movable element 3 on its side 18 and/or 19.

In fact, the hole 7 of the movable element 3 is positioned in a desired position, as one of the advantages of the device 100 is that it is easier to control the place of the core 4 in terms of the end product.

The hole 7 of the movable element 3, illustrated in FIG. 6, is in particular an equilateral triangle with side of 0.5 mm.

The core 4 and the hole 7 of the movable element 3 have the same section.

According to this additional feature, the movable element 3 prevents intrusion of the flow of material of the polymer part 10 into the interior 2 of the mould 1 via the hole 7 as long as the movable element 3 has not performed its role of positioning the core 4 in the proper place in the section of the interior 2 of the mould 1 relative to the direction of displacement 8. According to another feature, this also prevents the core 4 rotating on its axis in the interior 2 of the mould 1, which makes it possible to prevent damage to the core 4 during its positioning in the polymer part 10 when polymer 10 is inserted in the interior 2 of the mould 1.

To illustrate this, it can be seen that between FIG. 1 and FIG. 2, the movable element 3 is not located in the same position in the interior 2 of the mould 1.

In FIG. 1, the movable element 3 is at the level of the end 16 oriented on the side of the source of polymer 10, i.e. on the side of the upper plate of the injection moulding means 13. In this figure, the polymer part 10 is not yet inserted in the mould 1. On side 19, the core 4 is not yet aligned axially relative to the centre of the hole 7.

In FIG. 2, the movable element 3 is positioned further forward in the mould 1 and it can be seen that polymer 10 has been inserted in the interior 2 of the mould 1.

The polymer part 10 in the mould 1 is at a temperature of at least 150° C. (typically 170° C.) and is at a typical pressure of 15 to 20 MPa.

In FIG. 2, the core 4 on either side of the movable element 3 will not be subject to the same stresses.

On the side 18 of the movable element 3, where polymer 10 is inserted, the core 4 will be positioned with in terms of the end product.

In fact, before insertion of the polymer 10 the core 4 is flexible and is not subject to any constraint, i.e. it may be of curved shape. When the movable element 3 is pushed by the polymer 10, the movable element 3 constrains the core 4 and positions it in the polymer part 10. The core 4 covered with polymer 10 is in particular aligned axially on the centre of the hole 7 of the movable element 3.

Under the effect of the pressure of the polymer 10, the movable element 3 is pushed and it will slide along the core 4, which allows it to be positioned on its entire length covered with the polymer part 10. In other words, the core 4 located on the side 19 of the movable element 3 comprises a free portion in position 5 since this portion of the core 4 has not yet been under the constraint of the movable element 3.

In this embodiment, the walls of the interior 2 of the mould 1 are treated so as to facilitate displacement of the movable element 3 when the latter is compressed by the polymer part 10, allowing displacement of the movable element 3.

In a preferred embodiment, the internal walls of the mould 1 located in the interior 2 of the mould 1 are smooth enough to facilitate this type of displacement.

In other variants, a chemical and/or mechanical treatment may be carried out on the internal walls of the mould 1 located in the interior 2 of the mould 1 to promote this displacement.

This treatment is carried out prior to insertion of the movable element 3 in the mould 1.

The walls of the movable element 3 may also be treated so as to promote displacement of the movable element 3 in the mould 1.

The treatments envisaged may be of a chemical and/or mechanical nature.

FIGS. 1 and 2 also illustrate a first embodiment of the method for manufacturing an object comprising a polymer part 10, implemented with the device 100. This method comprises:

inserting the core 4 through the movable element 3, also called shuttle 3, via the hole 7 passing through the movable element 3, inserting the polymer part 10 in the mould 1, inside which the movable element 3 is arranged, so that the polymer part 10 is in contact with the movable element 3 on the first side 18 of the movable element 3 but not on the second side 19 of the movable element 3, displacing the movable element 3 in the mould 1 by exerting a force, originating from the polymer part 10, on the movable element 3, in such a way that the movable element 3 slides along the core 4 without a polymer part 10 passing to the second side 19 of the movable element 3, the movable element 3 constraining, at an entrance of the hole 7 on the first side 18, at each instant and as the movable element 3 is displaced, the position 6 of the portion of the core 4 in the course of being covered with polymer 10 at this instant.

The step of displacing the movable element 3 is a rectilinear motion in the direction of displacement 8.

The hole 7 passes through the movable element 3 parallel to the direction of displacement 8 of the movable element 3.

FIGS. 3, 4 and 5 illustrate a second embodiment of the device 200 according to the invention for manufacturing objects comprising a polymer part 10, implementing a second embodiment of the method according to the invention.

Only the differences with FIGS. 1, 2 and 6 will be described for presenting these second embodiments.

The device according to the invention presented is a device 200 for moulding or overmoulding a core 4 by self-centring of the core 4.

The device 200 according to FIGS. 3 and 4 comprises two moulds 1. Of course, in other variants, the device 200 may contain a plurality of moulds 1.

Each mould 1 comprises its movable element 3 arranged in its interior 2, this movable element 3 being configured for receiving the core 4 via the hole 7 passing through this movable element 3.

The device 200 also comprises the end 16 configured for inserting the polymer part 10, so that the polymer part 10 is in contact with the movable element 3 of each mould 1 on the first side 18 of the movable element 3 but not on the second side 19 of the movable element 3.

The device 200 comprises the injection moulding means 13 described above, but which this time are common to all the moulds 1. All the moulds 1 are arranged in parallel between the upper heating plate of the means 13 and the lower heating plate of the means 13.

Each movable element 3 is configured for being displaced in its mould 1 under the action of a force originating from the polymer part 10, in such a way that the movable element 3 slides along its core 4 without a portion of the polymer 10 passing on the second side 19 of the movable element 3, this movable element 3 constraining, at an entrance of its hole 7 on the first side 18, at each instant and as this movable element 3 is displaced, the position 6 of the portion of its core 4 in the course of being covered with polymer 10 at this instant.

Each mould 1 is pierced so as to allow its movable element 3 to come out of this mould 1 via an end 17 of the mould 1 opposite the end 16 via which the polymer part 10 is injected. The lower heating plate of the means 13 is therefore also pierced with as many holes (not illustrated) as there are moulds 1 at the level of the ends 17.

On the device 200, all the moulds 1 are similar. The moulds 1 are made of steel. In the case presented, the moulds 1 are of parallelepipedal shape, with constant exterior section. The moulds 1 have a length of 170 mm relative to the direction of displacement 8, with exterior section having the form of a square with a side of 60 mm and having a wall 10 mm thick.

The interior 2 of the moulds 1 is of constant section, having the form of a square with a side of 40 mm.

As the moulds 1 of the device 200 are identical, only a single mould 1 of the two moulds illustrated will be described in detail.

On the device 200, the core 4 is borne by one of its ends so that it is suspended upstream of the mould 1. The core 4 is in particular fixed at the polymer source of the means 13 (typically at the breaker plate).

According to another variant (not illustrated) of the device 200, the core 4 may be stretched, and held, on either side of its ends.

On the device 200, the shuttle 3, or movable element 3, illustrated in FIG. 5 is a square with a side of 40 mm.

In this embodiment, the core 4 is a strip. The core 4 comprises a length of 200 mm parallel to the direction of displacement 8, a width of 10 mm and a thickness of 0.2 mm.

In this embodiment, the movable element 3 is configured for centring the core 4 at the centre of the interior 2 of the mould 1. For this, the hole 7 is centred on the centre of its movable element 3.

The hole 7 of the movable element 3 typically has a radius of 5 mm.

On the face 18 of the movable element 3, the hole 7 is of rectangular shape, 10 mm long and 0.2 mm wide.

The dimension of the core 4, orthogonal to the direction of displacement 8, is typically of dimension equivalent to that of the hole 7 of the movable element.

In accordance with these arrangements, the invention guarantees and facilitates centring of the core 4 in terms of the end product. This is in particular useful for parts of small section, typically antennas, where centring is not necessarily guaranteed according to the prior art.

FIGS. 3 and 4 also illustrate two steps of a second embodiment of the method according to the invention.

The method comprises inserting the polymer part 10 in several moulds 1 via the source of polymer of the means 13 common to the different moulds 1.

The injection moulding means 13 in FIGS. 3 and 4 operate in the same way as the injection moulding means 13 described above with reference to FIGS. 1 and 2.

Each mould 1 has its movable element 3 arranged in its interior 2 in such a way that the polymer part 10 is in contact with this movable element 3 on a first side 18 of this movable element 3, but not on the second side 19 of the movable element 3. The core 4 is inserted via the hole 7 passing through this movable element 3.

The method comprises, for each mould 1, displacement of the movable element 3 in its mould 1 by exerting a force, originating from the polymer part 10, on the movable element 3, so that this movable element 3 slides along its core 4 without a portion of the polymer 10 passing to the second side 19 of the movable element 3, the movable element 3 constraining, at an entrance of the hole 7 on the first side 18, at each instant and as this movable element 3 is displaced, the position 6 of the portion of its core 4 in the course of being covered with polymer 10 at this instant.

Each mould 1 is pierced so as to allow its movable element 3 to come out of this mould 1 via the end 17 of the mould 1 opposite the end 16 via which the polymer part 10 is injected.

In fact, the movable elements 3 in each mould 1 are not necessarily displaced at the same speed between the different moulds 1. This feature makes it possible firstly to inform the operator when an object is completed. Furthermore, this makes it possible to limit the stresses, or strains, that might appear at the level of the core 4 of one of the moulds 1 if polymer 10 continues to be poured into a full mould 1 while the core 4 is under stress and under pressure of the polymer 10, whereas the other mould 1 is still being filled. The device 200 therefore continues to inject polymer 10 into each mould 1 until all the movable elements 3 have left the moulds 1, while avoiding damaging the cores 4 and/or the polymer 10 of the objects that are already completed.

The step of displacing the movable element 3 is a rectilinear motion in the direction of displacement 8.

The hole 7 passes through the movable element 3 parallel to the direction of displacement 8 of the movable element 3.

The movable element 3 and the interior 2 of the mould 1 are of the same section.

The movable element 3 centres the core 4 at the centre of the interior 2 of the mould 1.

The core 4 is held in place relative to the mould 1 by holding means.

The holding means are located outside the mould 1.

The method according to the invention may therefore be applied to several moulds 1 with the aim of designing several objects at the same time and/or in a similar manner. The advantage of such a method is that it guarantees the performance conferred by such a method on several objects while saving time in the design of said object. Economies of time and most probably of cost can be achieved.

Referring to FIGS. 5 to 10, we shall now describe several variants (combinable with one another) of the movable element 3 for any one of the embodiments of device 100, 200 or of method according to the invention.

The movable element 3 is a component of the device 100 or 200 that makes it possible to position the core 4 in terms of the end product.

The movable element 3 has a thickness that is comprised between 2 mm and 20 mm in the direction of displacement 8 of the movable element 3. The movable element 3 may be of varying shape, as can be seen from FIGS. 5 to 10.

In FIGS. 5, 7, 9 and 10, the movable element 3 is a square, for example with a side of 40 mm.

In FIGS. 6 and 8, the movable element 3 is a disk orthogonal to the direction of displacement 8, for example with a radius of 20 mm.

The method and the device according to the invention allow the creation of a plurality of parts. The movable element 3 may thus be of any other geometric shapes, such as for example a rectangle, a circle, a triangle, a star, etc.

The movable element 3 may be in one piece or composed of several separate parts.

Thus, FIG. 8 illustrates an example where the movable element 3 is a disk of radius 20 mm composed of two separate parts 12, 11 whereas for FIGS. 5 to 7 and 9 and 10, the movable element 3 is a part in one piece.

Furthermore, the movable element 3 may comprise other features, such as comprise one or a plurality of holes 7.

In FIGS. 5, 6 and 8 to 10, the movable elements 3 are perforated by a single hole 7.

This hole 7 makes it possible to pass the core 4, not illustrated here, through the movable element 3.

FIG. 7 illustrates another design variant of the movable element 3, since in this figure the movable element 3 is pierced with two holes 7 this time. This means that in this case the movable element 3 contained in the mould 1 will be able to accept two separate cores 4.

FIG. 7 therefore illustrates an arrangement of the movable element 3 that makes it possible to implement a variant of the method according to the invention comprising the following steps.

Owing to this plurality of holes, the variant of the method according to the invention comprises:
inserting several cores 4 through the movable element 3, each core 4 being inserted via a respective hole 7 passing through the movable element 3,
inserting the polymer part 10 in the mould 1, inside which the movable element 3 is arranged, so that the polymer part 10 is in contact with the movable element 3 on the first side 18 of the movable element 3, but not on the second side 19 of the movable element 3,
displacing the movable element 3 in the mould 1 by exerting the force, originating from the polymer part 10, on the movable element 3, in such a way that the movable element 3 slides along the cores 4 without a polymer part 10 passing on the second side 19 of the movable element 3, the movable element 3 constraining, at each instant and as the movable element 3 is displaced, the position 6 of the portion of each core 4 in the course of being covered with polymer 10 at this instant at an entrance of its respective hole 7 on the first side 18.

According to a variant of the device 100, 200 according to the invention, the device according to the invention therefore comprises:
the movable element 3 configured for receiving several cores 4 in such a way that each core 4 can be inserted via the respective hole 7 passing through the movable element 3,
the mould 1, inside which the movable element 3 is arranged, said mould 1 comprising the end 16 configured for inserting the polymer part 10, so that the polymer part 10 is in contact with the movable element 3 on the first side 18 of the movable element 3 but not on the second side 19 of the movable element 3, the movable element 3 being configured for being displaced in the mould 1 under the action of the force originating from the polymer part 10, in such a way that the movable element 3 slides along the cores 4 without a portion of the polymer 10 passing on the second side 19 of the movable element 3, the movable element 3 constraining, at each instant and as the movable element 3 is displaced, the position 6 of the portion of each core 4 in the course of being covered with polymer 10 at this instant at an entrance of its respective hole 7 on the first side 18.

In a variant of device and method according to the invention, not illustrated here, the cores 4 of one and the same movable element 3 may also be of different shapes.

In fact, the shape of this or these holes 7 adapts to the selected shape of the core 4 of the method or device according to the invention. As the core 4 may be of multiple shapes, the hole or holes 7 may also be of various shapes.

In the case of FIGS. 8 and 9 the hole 7 of the movable element 3 is a circle typically with a radius of 5 mm.

In the case of FIG. 6, the hole 7 of the movable element 3 is an equilateral triangle, for example with side of 0.5 mm.

In the case of FIG. 5, the hole 7 of the movable element is a rectangle 10 mm long and 0.2 mm wide.

Furthermore, the hole 7 of the movable element 3 may or may not be centred.

In FIGS. 5, 8 and 9, the hole 7 of the movable element 3 is centred on the centre of the movable element 3, whereas in FIG. 6, the hole 7 is offset relative to the centre of the movable element 3.

It should be noted that the hole 7 passes through the movable element 3 parallel to the direction of displacement 8 of the movable element 3.

In another variant of the movable element 3, the movable element 3 may comprise:
only a rigid portion or,
its rigid portion surrounded by a flexible perimeter 9 for adapting to the section of the interior 2 of the mould 1.

FIG. 9 illustrates a movable element 3 in the shape of a square with the same size as in FIG. 5, having a flexible perimeter 9 and pierced at its centre by a circular hole 7, of the same size as in FIG. 5.

The flexible perimeter 9 may be a thin, flexible metal lip.

The material of the flexible perimeter 9 may typically be bronze or beryllium or an alloy of these materials.

In the plan of FIG. 9, the flexible perimeter 9 typically has a width of a few millimetres.

In FIG. 9, the flexible perimeter 9 allows the movable element 3 to have a section that adapts to a variable section of the interior 2 of the mould 1. A common section prevents intrusion of the polymer part 10 into the mould 1 before the core 4 is positioned in the proper place in terms of the end product.

The movable element 3 may therefore be a single rigid part or may comprise a flexible perimeter 9.

FIG. 10 is an example of another variant of the form of the movable element 3.

In fact, the movable element 3 makes it possible to position the core 4 in terms of the end product. Now, in the preceding figures, the core 4 was positioned inside the movable element 3. It should be noted that other embodiments are possible.

In fact, in FIG. 10, the movable element 3 is of the same size as in FIG. 5. However, the movable element 3 is pierced by the hole 7 so as to place the core 4 at the periphery or on the perimeter of the movable element 3. The core 4 will be positioned as a structure peripheral to the movable element 3 as it will not be completely surrounded with material of the movable element 3. The core 4 is characterized in this case as an exoskeleton.

Of course, the invention is not limited to the examples which have just been described and numerous adjustments can be made to these examples without exceeding the scope of the invention.

The direction of displacement 8 may be oriented vertically or horizontally or obliquely relative to the ground.

In the vertical position, another embodiment of the devices 100 and 200 is distinguished. The devices 100 and 200 may be inverted so that the polymer part 10 is injected at the bottom. The direction of displacement 8 of the movable element 3 will be oriented as being opposite to gravity. This configuration in particular prevents the core 4 from falling.

Of course, the different characteristics, forms, variants and embodiments of the invention can be combined with one another in various combinations inasmuch as they are not incompatible or mutually exclusive. In particular, all the variants and embodiments described above can be combined together.

The invention claimed is:

1. A method for manufacturing an object comprising a polymer part, the method comprising:
inserting a core through a movable element via a hole passing through the movable element;
inserting the polymer part in a mould inside which the movable element is arranged, so that the polymer part is in contact with the movable element on a first side of the movable element but not on a second side of the movable element;
displacing the movable element in the mould by exerting a force, originating from the polymer part, on the movable element, in such a way that the movable element slides along the core, the movable element constraining, at an entrance of the hole on the first side, at each instant and as the movable element is displaced, the position of the portion of the core in the course of being covered with polymer at this instant so that, on the second side of the movable element, the core comprises a flexible portion in a non-fixed position and not yet aligned axially relative to the hole.

2. The method according to claim 1, characterized in that the hole of the movable element and the core are of the same section.

3. The method according to claim 1, characterized in that the hole of the movable element is located at the centre of the movable element.

4. The method according to claim 1, characterized in that the step of displacing the movable element is a rectilinear motion in a direction of displacement.

5. The method according to claim 4, characterized in that the hole passes through the movable element parallel to the direction of displacement of the movable element.

6. The method according to claim 1, characterized in that the movable element comprises a central part made of rigid material.

7. The method according to claim 1, characterized in that the interior of the mould is of constant section.

8. The method according to claim 7, characterized in that the movable element and the interior of the mould are of the same section.

9. The method according to claim 1, characterized in that the movable element comprises a flexible perimeter so that the movable element has a section that adapts to a variable section of the interior of the mould.

10. The method according to claim 1, characterized in that the movable element centres the core at the centre of the interior of the mould.

11. The method according to claim 1, characterized in that the core is metallic.

12. The method according to claim 1, wherein the polymer part comprises an elastomer.

13. The method according to claim 1, characterized in that it comprises:
inserting several cores through the movable element, each core being inserted via a respective hole passing through the movable element,
inserting the polymer part in the mould, inside which the movable element is arranged, so that the polymer part is in contact with the movable element on the first side of the movable element,
displacing the movable element in the mould by exerting the force, originating from the polymer part, on the movable element in such a way that the movable element slides along the cores, the movable element constraining, at each instant and as the movable element is displaced, the position of the portion of each core in the course of being covered with polymer at this instant at an entrance of its respective hole on the first side.

14. The method according to claim 1, characterized in that the core is held in place relative to the mould by holding means.

15. The method according to claim 14, characterized in that the holding means are located outside the mould.

16. The method according to claim 1, characterized in that it comprises inserting the polymer part in several moulds via a common source of the polymer part,

- each mould having a movable element arranged in its interior in such a way that the polymer part is in contact with this movable element on a first side of this movable element, through which a core is inserted via a hole passing through this movable element,
- said method comprising, for each mould, displacing the movable element in its mould by exerting a force, originating from the polymer part, on the movable element so that this movable element slides along its core, the movable element constraining, at an entrance of the hole on the first side, at each instant and as this movable element is displaced, the position of the portion of its core in the course of being covered with polymer at this instant,
- each mould being pierced so as to allow its movable element to come out of this mould via an end of the mould opposite an end via which the polymer part is injected.

17. The method according to claim 12, wherein the elastomer is rubber.

* * * * *